UNITED STATES PATENT OFFICE.

WILLIAM MORRISON, OF DES MOINES, IOWA.

ELECTROLYTE FOR SECONDARY BATTERIES.

1,139,214. Specification of Letters Patent. Patented May 11, 1915.

No Drawing. Application filed September 11, 1914. Serial No. 861,270.

*To all whom it may concern:*

Be it known that I, WILLIAM MORRISON, a citizen of the United States, residing at Des Moines, in the county of Polk and State of Iowa, have invented certain new and useful Improvements in Electrolytes for Secondary Batteries, of which the following is a specification.

My invention relates to secondary batteries and electrolytes therefor, and has for its object to produce an electrolyte that will materially preserve the electrodes from disintegration in use, thereby greatly prolonging the life of the battery.

The electrolyte is preferably made by dissolving titanic acid in boiling concentrated sulfuric acid to nearly saturation. Then, if a weaker titanic acid solution is desired, in proportion to the per cent. of sulfuric acid, concentrated sulfuric acid is added until any desired dilution is obtained, the utility of the electrolyte not being dependent upon the per cent. of titanium compound present as improved results are obtained with an electrolyte containing all proportions of titanium; too concentrated solutions of titanium are, however, less desirable. The cooled solution is then diluted with water until it reaches a specific gravity corresponding to that of ordinary battery electrolytes, that is, about 1.250 at ordinary temperatures, and is then ready for use in lead batteries in place of the usual electrolytes.

While I prefer to use titanic acid, or titanic oxids, other titanium compounds that dissolve in sulfuric acid, and form the same solution, may be used.

Ordinary electrodes of lead peroxid and spongy lead, when used with this electrolyte, are preserved from disintegration for a much longer period than is possible with electrolytes in general use at this time, giving the battery a greatly prolonged life.

I claim:—

1. An electrolyte for secondary batteries, comprising a solution of a titanium compound.

2. An electrolyte for secondary batteries, comprising an acid solution of a titanium compound.

3. An electrolyte for secondary batteries, comprising a sulfuric acid solution of a titanium compound.

4. An electrolyte for secondary batteries, comprising a sulfuric acid solution of titanic acid.

5. A secondary battery, comprising electrodes and an electrolyte containing a titanium compound dissolved therein.

6. A secondary battery, comprising electrodes and an acid electrolyte containing a titanium compound dissolved therein.

7. A secondary battery, comprising electrodes, and a sulfuric acid electrolyte containing a titanium compound dissolved therein.

8. A secondary battery, comprising electrodes, and a sulfuric acid electrolyte containing titanic acid dissolved therein.

In testimony whereof I affix my signature in presence of two witnesses.

WILLIAM MORRISON.

Witnesses:
 JOSEPH W. HARRIS,
 J. H. BRICKENSTEIN.

Copies of this patent may be obtained for five cents each, by addressing the "Commissioner of Patents, Washington, D. C."